(12) United States Patent
Seo et al.

(10) Patent No.: US 8,013,970 B2
(45) Date of Patent: Sep. 6, 2011

(54) ARRAY SUBSTRATE FOR IN-PLANE SWITCHING MODE LIQUID CRYSTAL DISPLAY DEVICE AND METHOD OF FABRICATING THE SAME

(75) Inventors: Bum-Sik Seo, Daegu (KR); Ji-Won Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/826,355

(22) Filed: Jun. 29, 2010

(65) Prior Publication Data
US 2010/0265447 A1   Oct. 21, 2010

Related U.S. Application Data (63) Continuation of application No. 11/765,992, filed on Jun. 20, 2007, now Pat. No. 7,764,349.

(30) Foreign Application Priority Data

Jun. 21, 2006  (KR) .................. 10-2006-0055781

(51) Int. Cl.
*G02F 1/1343*  (2006.01)
*G02F 1/1333*  (2006.01)
(52) U.S. Cl. .................. 349/141; 349/122; 349/147
(58) Field of Classification Search .................. None
See application file for complete search history.

(56) References Cited

U.S. PATENT DOCUMENTS

| | | | |
|---|---|---|---|
| 6,188,459 B1 | 2/2001 | Kim | |
| 6,449,027 B2 | 9/2002 | Lee et al. | |
| 6,950,164 B2 | 9/2005 | Park et al. | |
| 7,764,349 B2* | 7/2010 | Seo et al. ............. | 349/141 |
| 2004/0070718 A1 | 4/2004 | Saigo et al. | |
| 2004/0125300 A1 | 7/2004 | Lee | |

FOREIGN PATENT DOCUMENTS

KR   10-2005-0067859   7/2005

\* cited by examiner

*Primary Examiner* — Omar Rojas
(74) *Attorney, Agent, or Firm* — Birch, Stewart, Kolasch & Birch, LLP

(57) ABSTRACT

An array substrate for an in-plane switching mode liquid crystal display device and its fabrication method are discussed. According to an embodiment, the array substrate includes a gate line and a data line crossing the gate line on a base substrate, so as to define a pixel region; a thin film transistor connected to the gate line and the data line; a plurality of pixel electrodes disposed in the pixel region and connected to the thin film transistor; a common line extending substantially parallel to the gate line; and a plurality of common electrodes alternately arranged with the plurality of pixel electrodes in the pixel region, wherein the plurality of common electrodes include at least one first common electrode adjacent to the data line and connected to the common line, and at least one second common electrode extending substantially parallel to the date line and not directly connected to the common line.

16 Claims, 7 Drawing Sheets

ARRAY SUBSTRATE FOR IN-PLANE SWITCHING MODE LIQUID CRYSTAL DISPLAY DEVICE AND METHOD OF FABRICATING THE SAME

The present application is a continuation application of application Ser. No. 11/765,992 filed Jun. 20, 2007 which application claims the priority benefit of Korean Patent Application No. 10-2006-0055781 filed in Korea on Jun. 21, 2006. Both applications are hereby incorporated in their entirety by reference.

BACKGROUND OF THE INVENTION

1. Field of the Invention

The present invention relates to an array substrate for an in-plane switching (IPS) mode liquid crystal display (LCD) device and more particularly to an array substrate for an IPS mode LCD device having a repair pattern and a method of fabrication the array substrate.

2. Discussion of the Related Art

A related art liquid crystal display (LCD) device uses optical anisotropy and polarization properties of liquid crystal molecules. The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

Since the LCD device including a thin film transistor (TFT) as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and the TFT, and the color filter substrate may include a color filter layer and a common electrode. The AM-LCD device is driven by an electric field between the pixel electrode and the common electrode. However, since the AM-LCD device uses a vertical electric field, the AM-LCD device has a bad viewing angle.

Figure 1:
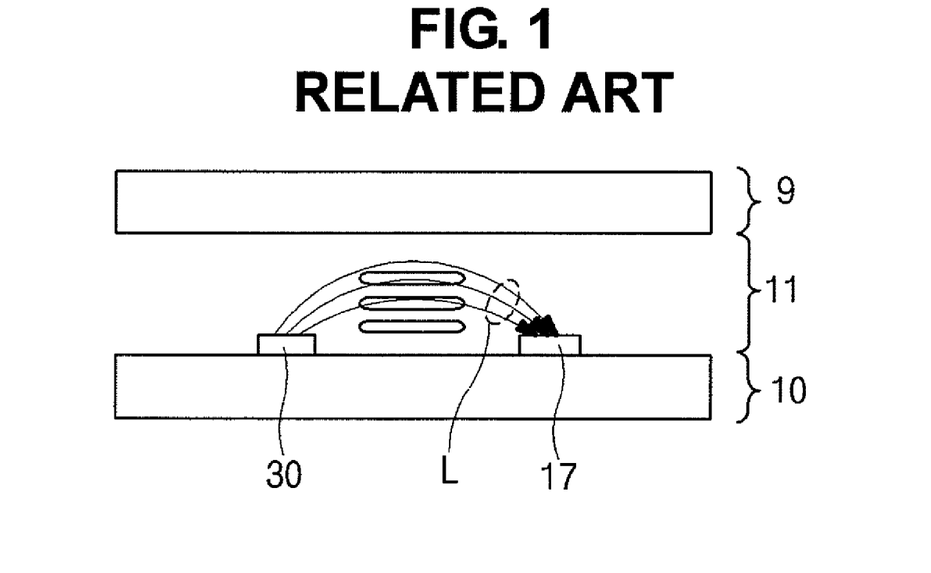
FIG. 1 is a cross-sectional view of an IPS mode LCD device according to the related art.

An IPS mode LCD device may be used to resolve the above-mentioned limitations. FIG. 1 is a cross-sectional view of an IPS mode LCD device according to the related art. As shown in FIG. 1, the array substrate and the color filter substrate are separated and face each other. The array substrate includes a first substrate 10, a common electrode 17 and a pixel electrode 30. Though not shown, the array substrate may include a TFT, a gate line and a data line. The color filter substrate includes a second substrate 9, a color filter layer (not shown), and so on. A liquid crystal layer 11 is interposed between the first substrate 10 and the second substrate 9. Since the common electrode 17 and the pixel electrode 30 are formed on the first substrate 10 on the same level, a horizontal electric field "L" is generated between the common and pixel electrodes 17 and 30.

Figure 2A:
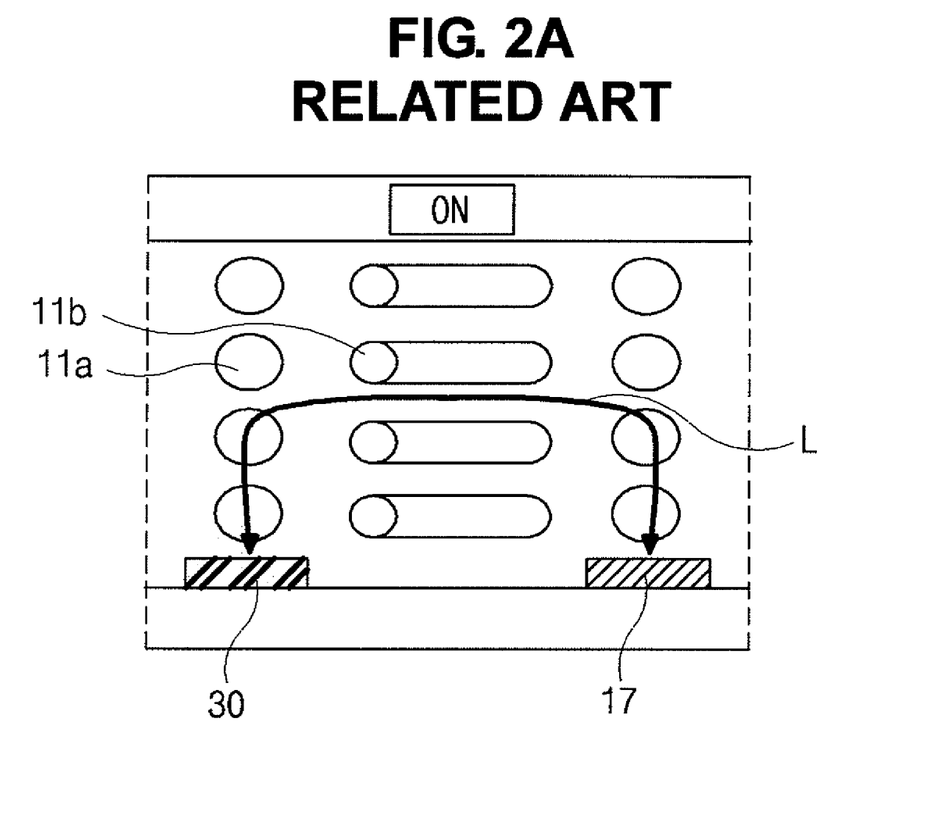
FIGS. 2A and 2B are cross-sectional views showing turned on/off conditions of an IPS mode LCD device according to the related art.
Figure 2B:
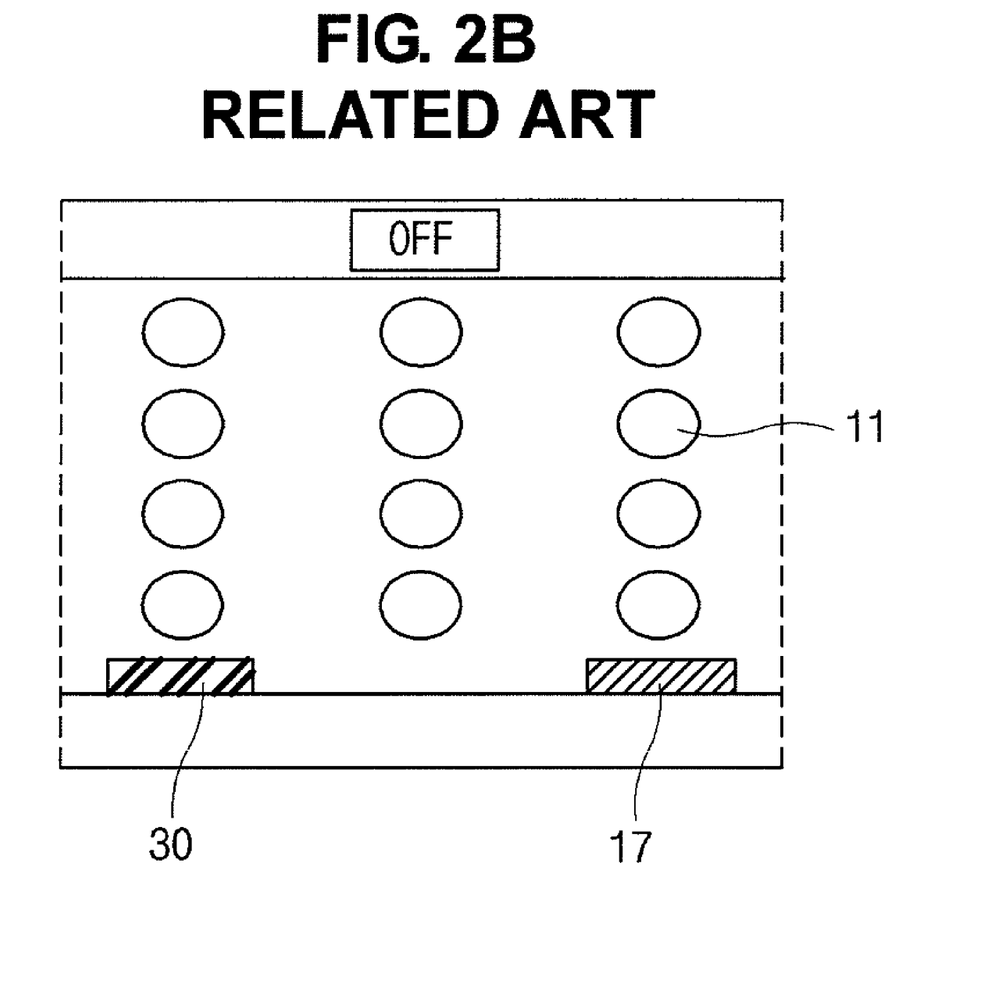

FIGS. 2A and 2B are cross-sectional views showing turned on/off conditions of an IPS mode LCD device according to the related art. As shown in FIG. 2A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by the horizontal electric field, the IPS mode LCD device has a characteristic of a wide viewing angle. FIG. 2B shows a condition when the voltage is not applied to the IPS mode LCD device. Because an electric field is not generated between the common and pixel electrodes 17 and 30, the arrangement of liquid crystal molecules 11 is not changed.

Figure 3:
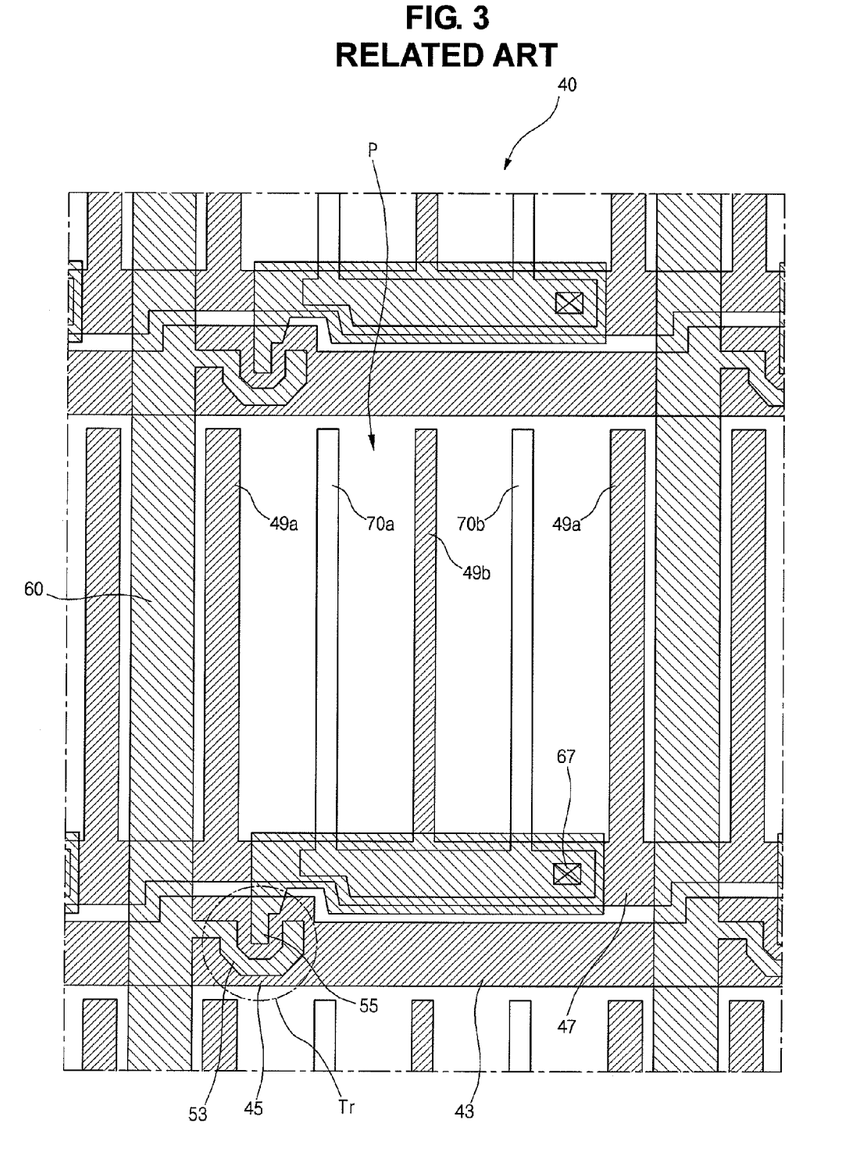
FIG. 3 is a plane view showing an array substrate for an IPS mode LCD device according to the related art.

FIG. 3 is a plane view showing an array substrate for an IPS mode LCD device according to the related art. As shown in FIG. 3, a gate line 43, a common line 47 and a data line 60 are formed on a first substrate 40. The common line 47 is parallel to and spaced apart from the gate line 43. The data line 60 crosses the gate line 43 to define a pixel region P.

A TFT Tr including a gate electrode 45, a semiconductor layer (not shown), a source electrode 53 and a drain electrode 55 is formed at crossing of the gate and data lines 43 and 60. The gate electrode 45 is connected to the gate line 43. The gate electrode 45 may be a portion of the gate line 43. The source electrode 53 is connected to the data line 60 and spaced apart from the drain electrode 55. In addition, a plurality of pixel electrodes 70a and 70b and a plurality of common electrodes 49a and 49b are formed in the pixel region P. The plurality of pixel electrodes 70a and 70b and the plurality of common electrodes 49a and 49b are parallel to and alternately arranged with each other. The plurality of pixel electrodes 70a and 70b are connected to the drain electrode 55 through a drain contact hole 67. The plurality of common electrodes 49a and 49b are connected to the common line 47. The plurality of common electrodes 49a and 49b may extend from the common line 47.

As mentioned above, the IPS mode LCD device of FIG. 3 has a wide viewing angle due to a horizontal electric field between the common and pixel electrodes. However, there are some limitations. Particularly, when an electric line, e.g., the data line, is disconnected during a fabricating process, it is difficult to repair the disconnected data line and thus, the production yield is reduced. Moreover, although not shown in FIG. 3, since a gate insulating layer and a passivation layer are interposed between the common electrode and the pixel electrode, an electric field between the common electrode and the pixel electrode is not perfectly horizontal such that a liquid crystal layer is driven with unexpected arrangement. Furthermore, since a magnitude of the electric field between the common electrode and the pixel electrode decreases due to the gate insulating layer and the passivation layer, power consumption increases.

SUMMARY OF THE INVENTION

Accordingly, the present invention is directed to an array substrate for an IPS mode LCD device and a method of fabrication the same that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, an array substrate for an in-plane switching mode liquid crystal display device according to an aspect of the present invention comprises a gate line on a substrate; a data line crossing the gate line; an auxiliary data line disposed over the data line and connected to the data line; a thin film transistor connected to the gate line and the data line; a plurality of pixel electrodes disposed in the pixel region and connected to the thin film transistor; and a plurality of common electrodes alternately arranged with the plurality of pixel electrodes in the pixel region and including first common electrodes disposed at a boundary area of the pixel region and at least one second common electrode between the first common electrodes, wherein the second common electrode, the plurality of pixel electrodes and the auxiliary data line are formed of a same material and a same layer as one another.

In another aspect of the present invention, a method of fabricating an array substrate for an in-plane switching mode liquid crystal display device comprises forming forming a gate line, a gate electrode, a common line, and first common electrodes on a substrate, the gate electrode connected to the gate line, the first common electrodes connected to the common line; forming a gate insulating layer on the gate line, the gate electrode, the common line, and the first common electrodes; forming a semiconductor layer on the gate insulating layer, source and drain electrodes on the semiconductor layer and spaced apart from each other, and a data line connected to the source electrode and crossing the gate line; forming a passivation layer on the source electrode, the drain electrode and the data line, the passivaton layer having a data contact hole exposing the data line, a drain contact hole exposing the drain electrode and at least one common contact hole exposing the first common electrodes; and forming a plurality of pixel electrodes, a second common electrode and an auxiliary data line on the passivation layer, wherein the plurality of pixel electrodes and the second common electrode are disposed between the first common electrodes and alternately arranged with each other, the plurality of pixel electrodes are connected to the drain electrode through the drain contact hole, the second common electrode is connected to the first common electrodes through the at least one common contact hole, and the auxiliary data line is connected to the data line through the data contact hole.

In another aspect of the present invention, a method of fabricating an array substrate for an in-plane switching mode liquid crystal display device comprises forming a gate line, a gate electrode connected to the gate line and a common line on a substrate; forming a gate insulating layer on the gate line, the gate electrode and the common line; forming a semiconductor layer on the gate insulating layer, source and drain electrodes on the semiconductor layer and spaced apart from each other, and a data line connected to the source electrode and crossing the gate line; forming a passivation layer on the source electrode, the drain electrode and the data line, the passivaton layer having a data contact hole exposing the data line, a drain contact hole exposing the drain electrode and at least one common contact hole exposing the common line; and forming a plurality of pixel electrodes, first and second common electrodes and an auxiliary data line on the passivation layer, wherein the plurality of pixel electrodes and the second common electrode are disposed between the first common electrodes and alternately arranged with each other, the plurality of pixel electrodes are connected to the drain electrode through the drain contact hole, the first common electrodes are connected to the common line through the at least one common contact hole, the second common electrode is connected to the first common electrodes, and the auxiliary data line is connected to the data line through the data contact hole.

According to another aspect, the present invention provides a liquid crystal display device comprises a first substrate including: a gate line and a data line crossing the gate line on a base substrate, so as to define a pixel region, a thin film transistor connected to the gate line and the data line, a plurality of pixel electrodes disposed in the pixel region and connected to the thin film transistor, a common line extending substantially parallel to the gate line, and a plurality of common electrodes alternately arranged with the plurality of pixel electrodes in the pixel region, wherein the plurality of common electrodes include at least one first common electrode adjacent to the data line and connected to the common line, and at least one second common electrode extending substantially parallel to the date line and not directly connected to the common line; a second substrate; and a liquid crystal layer disposed between the first and second substrates.

According to another aspect, the present invention provides a liquid crystal display device comprises a first substrate including: a gate line and a data line crossing the gate line on a base substrate, so as to define a pixel region, an auxiliary data line disposed over the data line and connected to the data line; a thin film transistor connected to the gate line and the data line, a plurality of pixel electrodes disposed in the pixel region and connected to the thin film transistor, a common line extending substantially parallel to the gate line, and a plurality of common electrodes alternately arranged with the plurality of pixel electrodes in the pixel region; a second substrate; and a liquid crystal layer disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

An array substrate for an IPS mode LCD device has an auxiliary data line over a data line. A passivation layer is interposed between the auxiliary data line and the data line, and the auxiliary data line is connected to the data line through a data contact hole on the passvation layer. Moreover, a pixel electrode and a common electrode are formed on a substrate on the same level.

Figure 4:
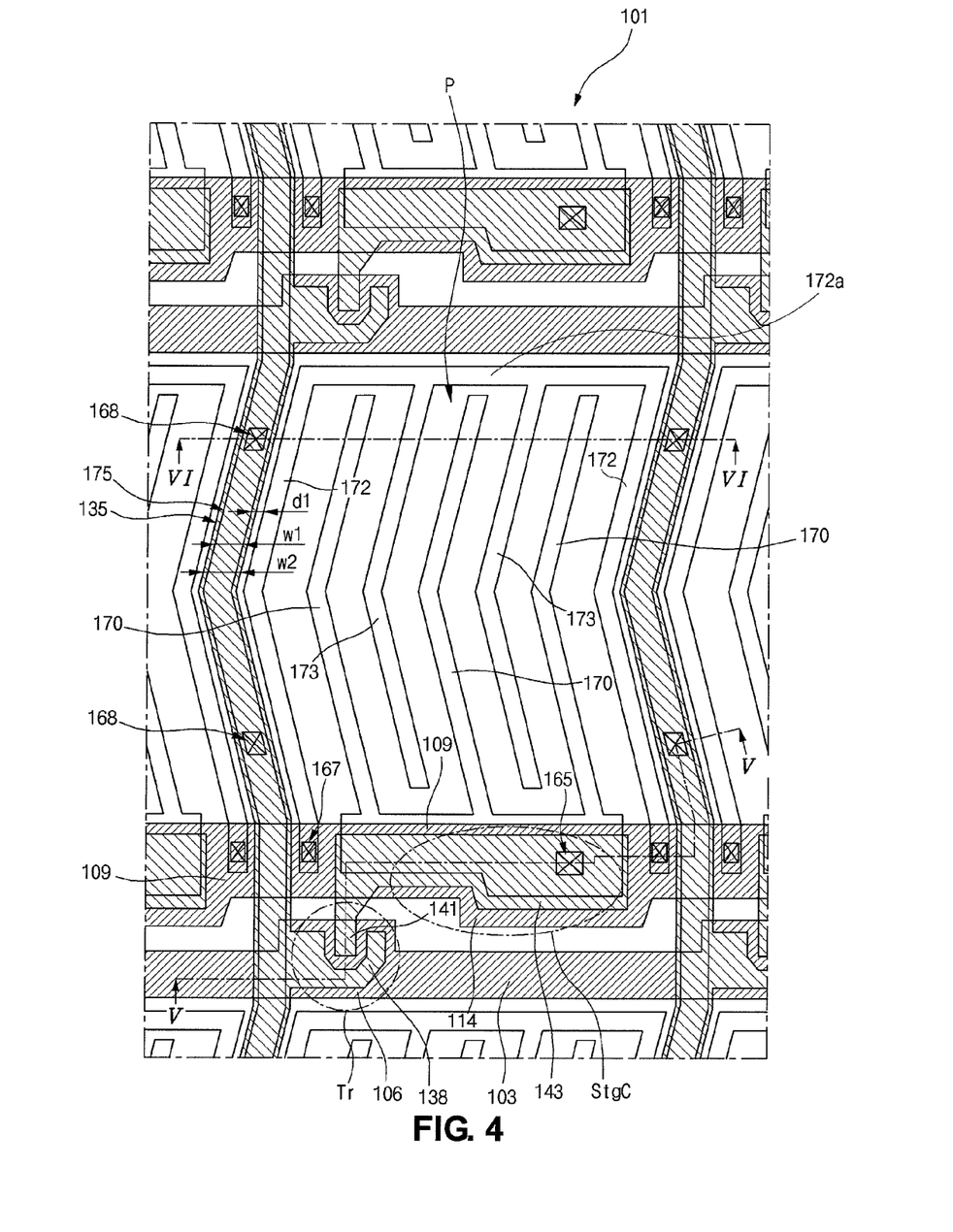
FIG. 4 is a plane view showing an array substrate for an IPS mode LCD device according to a first embodiment of the present invention.

FIG. 4 is a plane view showing an array substrate for an IPS mode LCD device according to a first embodiment of the present invention. As shown in FIG. 4, a gate line 103 and a data line 135 are formed on a substrate 101. The gate line 103 and the data line 135 cross each other to define a pixel region P. A common line 109 is formed on the substrate 101. The common line 109 is substantially parallel to and spaced apart from the gate line 103. A TFT Tr including a gate electrode 106, a gate insulating layer (shown in FIG. 5), a semiconductor layer (shown in FIG. 5), a source electrode 138 and a drain electrode 141 is formed at crossing of the gate and data lines 103 and 135. A gate electrode 106 is connected to the gate line 103, and the gate insulating layer is formed on the gate electrode 106. The gate electrode 106 may be a portion of the gate line 103. The semiconductor layer is formed on the gate insulating layer and corresponds to the gate electrode 106. The source and drain electrodes 138 and 141 are formed on the semiconductor layer and spaced apart from each other. The source electrode 138 is connected to the data line 135.

First common electrodes 172 and second common electrodes 173, which are connected to the common line 109 through a common contact hole 167, are formed in the pixel region P. The first common electrodes 172 are disposed at or near the boundary portions of the pixel region P. For instance, the first common electrodes 172 are adjacent to the data line 135. The second common electrodes 173 are disposed between the first common electrodes 172. The first and second common electrodes 172 and 173 are parallel or substantially parallel to the data line 135. Two ends of the first common electrodes 172 are connected to the common line 109 through the common contact holes 167, whereas a portion 172a (parallel to the common line 109) of the first common electrodes 172 is connected to ends of the second common electrodes 173. In fact, the portion 172a can be part of the first or second common electrodes 172 or 173. The first and second common electrodes 172 and 173 may be integrally formed with each other. In addition, a plurality of pixel electrodes 170 connected to the drain electrode 141 through a drain contact hole 165 are formed in the pixel region P. The plurality of pixel electrodes 170 are substantially parallel to the first and second common electrodes 172 and 173. The plurality of pixel electrodes 170 may be disposed between one of the first common electrodes 172 and one of the second common electrodes 173 and between the second common electrodes 173. Namely, the plurality of pixel electrodes 170 are alternately arranged with the first and second common electrodes 172 and 173. The first common electrodes 172, the second common electrodes 173 and the plurality of pixel electrodes 170 are parallel to or substantially parallel to the data line 135. The first common electrodes 172, the second common electrodes 173 and the plurality of pixel electrodes 170 may be formed of a transparent conductive material such as indium-tin-oxide (ITO) and indium-zinc-oxide (IZO), and disposed on the same level. In FIG. 4, each of the data line 135, the first common electrodes 172, the second common electrodes 173 and the plurality of pixel electrodes 170 has a bent portion to produce multi-domains. However, there is no limitation in the shape. For instance, the data line 135, the first common electrodes 172, the second common electrodes 173 and the plurality of pixel electrodes 170 may have a linear (e.g. straight line) shape or a zigzag shape.

Figure 6:
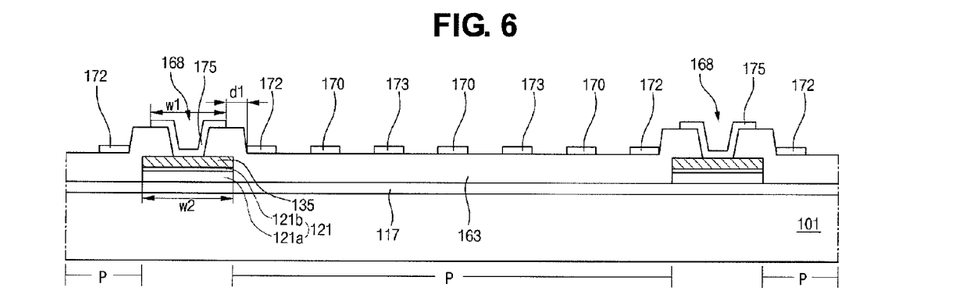
FIG. 6 is a cross-sectional view taken along the line VI-VI of FIG. 4.

An auxiliary data line 175 is formed along the data line 135. The auxiliary data line 175 is disposed over the data line 135 and has substantially the same shape as the data line 135. The auxiliary data line 175 is connected to the data line 135 through a data contact hole 168. At least two data contact holes 168 may be formed at or near the both ends of the data line 135 in each pixel region P. The auxiliary data line 175 may be formed of a transparent conductive material such as indium-tin-oxide (ITO) and indium-zinc-oxide (IZO). A width w1 of the auxiliary data line 175 is equal to or smaller than a width w2 of the data line 135 (FIG. 6). The first common electrodes 172 are spaced apart from the auxiliary data line 175 by a first distance d1 to prevent shorting defects between the auxiliary data line 175 and the first common electrodes 172.

In addition, the drain electrode 141 extends and overlaps the common line 109. An overlapped portion of the common line 109 functions as a first capacitor electrode 114, and an overlapped portion of the drain electrode 141 functions as a second capacitor electrode 143. The gate insulating layer and the semiconductor layer interposed between the first and second capacitor electrodes 114 and 143 functions as a dielectric material. The first capacitor electrode 114, the second capacitor electrode 143, the gate insulating layer and the semiconductor layer constitute a storage capacitor StgC.

Figure 5:
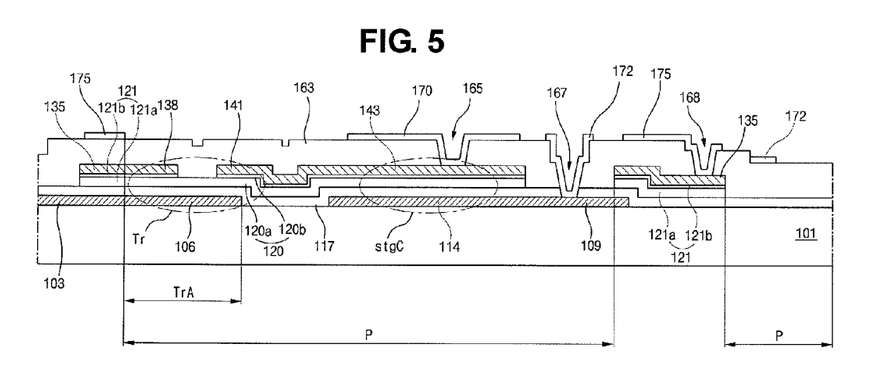
FIG. 5 is a cross-sectional view taken along the line V-V of FIG. 4.

FIG. 5 is a cross-sectional view taken along the line V-V of FIG. 4, and FIG. 6 is a cross-sectional view taken along the line VI-VI of FIG. 4. As shown in FIGS. 5 and 6, a plurality of pixel regions P and switching regions TrA are defined on the substrate 101. The gate line 103, the gate electrode 106, the common line 109 and the first capacitor electrode 114 are formed on the substrate 101. The gate line 103 in the switching region TrA functions as the gate electrode 106. Namely, the gate electrode 106 is a portion of the gate line 103. The common line 109 is parallel to and spaced apart from the gate line 103. A portion of the common line 109 functions as the first capacitor electrode 114. A gate insulating layer 117 is formed on the gate line 103, the gate electrode 106, the common line 109 and the first capacitor electrode 114. A semiconductor layer 120 including an active layer 120a of intrinsic amorphous silicon and an ohmic contact layer 120b of impurity-doped amorphous silicon is formed on the gate insulating layer 117 and corresponding to the gate electrode 106. The source electrode 138 and the drain electrode 141 are formed on the semiconductor layer 120 and spaced apart form each other. The active layer 120a under the ohmic contact layer 120b is exposed through the source and drain electrodes 138 and 141. The gate electrode 106, the semiconductor layer 120 including the active layer 120a and the ohmic contact layer 120b, the source electrode 138 and the drain electrode 141 constitute the TFT Tr in the switching region TrA. The data line 135 is connected to the source electrode 138 and crosses the gate line 103 to define the pixel region P.

Since an intrinsic amorphous silicon layer, an impurity-doped amorphous silicon layer and a conductive metal layer are preferably etched using a single mask to form the source electrode 138, the drain electrode 141, the data line 135, the ohmic contact layer 120b and the active layer 120a, a semiconductor pattern 121 including an intrinsic amorphous silicon pattern 121a and an impurity-doped amorphous silicon pattern 121b is disposed under the data line 135. The intrinsic amorphous silicon pattern 121a and the impurity-doped amorphous silicon pattern 121b respectively extend from the active layer 120a and the ohmic contact layer 120b. However, when the source electrode, the drain electrode and the data line are formed using a different mask process than the active layer and the ohmic contact layer, the intrinsic amorphous silicon pattern 121a and the impurity-doped amorphous silicon pattern 121b may not exist under the data line 135. The drain electrode 141 extends and overlaps the common line 109 to define the first and second capacitor electrodes 114 and 143. As mentioned above, the first capacitor electrode 114, the second capacitor electrode 143, the gate insulating layer 117 and the semiconductor layer 120 between the first and second capacitor electrodes 114 and 143 constitute the storage capacitor StgC. When the source electrode, the drain electrode and the data line are formed using different mask process than the active layer and the ohmic contact layer, a single dielectric material of the gate insulating layer may exist between the first and second capacitor electrodes 114 and 143.

A passivation layer 163 having the drain contact hole 165, the common contact hole 167 and the data contact hole 168 is formed respectively on the source electrode 138, the drain electrode 141 and the data line 135. The drain contact hole 165 exposes the drain electrode 141, the common contact hole 167 exposes the common line 109, and the data contact hole 168 exposes the data line 135. More specifically, the drain contact hole 165 exposes the second capacitor electrode 143.

The plurality of pixel electrodes 170, the first common electrodes 172, the second common electrodes 173 and the auxiliary data line 175 are formed on the passivation layer 163. The plurality of pixel electrodes 170 are connected to the drain electrode 141 through the drain contact hole 165, the first common electrodes 172 are connected to the common line 109 through the common contact hole(s) 167, and the auxiliary data line 175 is connected to the data line 135 through the data contact hole(s) 168. The first common electrodes 172 are formed at or near the boundary portions of the pixel region P, and the second common electrodes 173 are disposed between the first common electrodes 172. The plurality of pixel electrodes 170 are disposed between one of the first common electrodes 172 and one of the second common electrodes 173 and between the second common electrodes 173. In other words, the plurality of pixel electrodes 170 are alternately arranged with the first and second common electrodes 172 and 173. The plurality of pixel electrodes 170, the first common electrodes 172 and the second common electrodes 173 are formed of a transparent conductive material such as indium-tin-oxide (ITO) and indium-zinc-oxide (IZO). The pixel electrodes 170, the second common electrodes 173, and the first common electrodes 172 (excluding the portion 172a) are disposed parallel to or substantially parallel to the data line 135. The plurality of pixel electrodes 170, the first common electrodes 172 and the second common electrodes 173 may have a bent shape to produce multi-domains. The auxiliary data line 175 is preferably also formed of a transparent conductive material such as indium-tin-oxide (ITO) and indium-zinc-oxide (IZO), and disposed over the data line 135. The auxiliary data line 175 preferably has substantially the same shape as the data line 135. As mentioned, the width w1 of the auxiliary data line 175 is equal to or smaller than the width w2 of the data line 135. The auxiliary data line 175 is spaced apart from the first common electrodes 172 by the first distance d1 to prevent shorting defects between the auxiliary data line 175 and the first common electrodes 172.

The TFT Tr receives a signal via the data line 135. In a conventional LCD device, if a data line is disconnected, its TFT Tr can not receive the signal. However, in the array substrate for the IPS mode LCD device according to the first embodiment of the present invention, since the auxiliary data line 175 is disposed over and connected to the data line 135, the TFT Tr can receive the signal due to the auxiliary data line 175 even when the data line 135 disconnected. Namely, the auxiliary data line 175 functions as a self-repairing line, which is advantageous.

Moreover, since the plurality of pixel electrodes 170, the first common electrodes 172 and the second common electrodes 173 are formed on the same level, a perfect horizontal electric field can be generated between the pixel electrode 170 and the first common electrode 172 and between the pixel electrode 170 and the second common electrode 173, whereby the IPS mode LCD device displays improved images. In addition, since there is no insulating layer, for example, a gate line and a passivation layer, between the common and pixel electrodes as shown in FIG. 6, power consumption decreases.

Although effective, in the array substrate for the IPS mode LCD device according to the first embodiment of the present invention, sine the auxiliary data line and the common electrodes are formed on the same level, a sufficient distance between the auxiliary data line and the first common electrode is required to prevent shorting defects. Moreover, since liquid crystal molecules are unexpectedly arranged due to an electric field between the auxiliary data line and the first common electrode, a black matrix on a color filter layer covers a portion between the auxiliary data line and the first common electrode such that the aperture ratio may decrease. When a distance between the auxiliary data line and the first common electrode increases to prevent shoring defects, the aperture ratio may further decrease.

Figure 7:
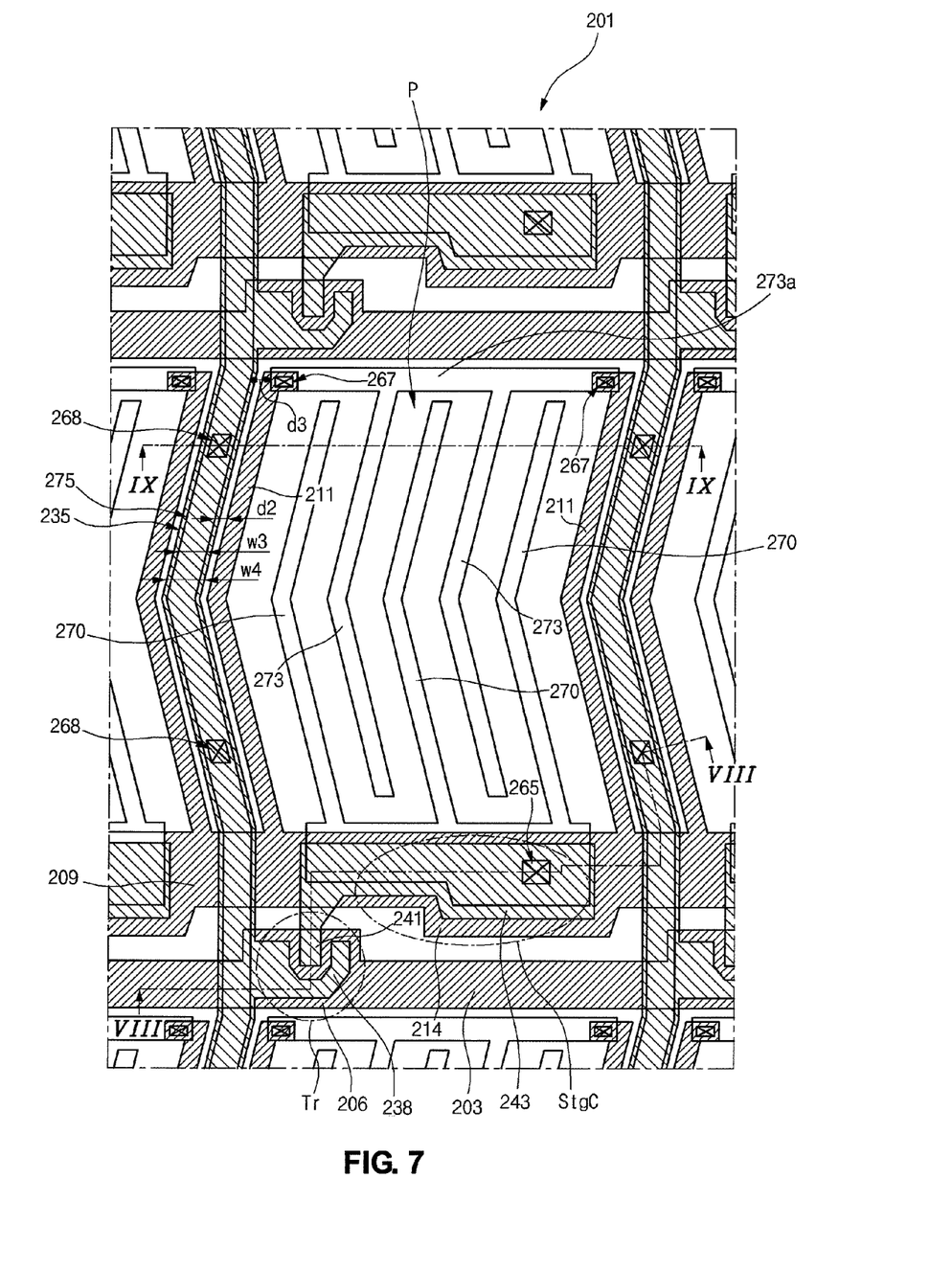
FIG. 7 is a plane view showing an array substrate for an IPS mode LCD device according to a second embodiment of the present invention.

In a second embodiment of the present invention, there is no shorting defects and the aperture ratio is improved. FIG. 7 is a plane view showing an array substrate for an IPS mode LCD device according to the second embodiment of the present invention. As shown in FIG. 7, a gate line 203 and a data line 235 are formed on a substrate 201. The gate line 203 and the data line 235 cross each other to define a pixel region P. A second common line 209 is formed on the substrate 201. The second common line 209 is substantially parallel to and spaced apart from the gate line 203. First common electrodes 211 extend from the second common line 209 to be substantially parallel to the data line 235. The first common electrodes 211 are disposed at or near the boundary portions of the pixel region P. A TFT Tr including a gate electrode 206, a gate insulating layer (shown in FIG. 8), a semiconductor layer (shown in FIG. 8), a source electrode 238 and a drain electrode 241 is formed at a crossing of the gate and data lines 203 and 235. The gate electrode 206 is connected to the gate line 203, and the gate insulating layer is formed on the gate electrode 206. The gate electrode 206 may be a portion of the gate line 203. The semiconductor layer is formed on the gate insulating layer and corresponds to the gate electrode 206. The source and drain electrodes 238 and 241 are formed on the semiconductor layer and spaced apart from each other. The source electrode 238 is connected to the data line 235.

Second common electrodes 273 include a first common line 273a (extending parallel to the second common line 209) which is connected to the first common electrodes 211 through common contact holes 267, and are formed in the pixel region P. The second common electrodes 273 are disposed between the first common electrodes 272 and substantially parallel (excluding the first common line 273a) to the first common electrodes 211. In addition, a plurality of pixel electrodes 270 connected to the drain electrode 241 through a drain contact hole 265 are formed in the pixel region P. The plurality of pixel electrodes 270 are substantially parallel to the first and second common electrodes 211 and 273. The plurality of pixel electrodes 270 may be disposed between one the first common electrodes 211 and one of the second common electrodes 273 and between the second common electrodes 273. Namely, the plurality of pixel electrodes 270 are alternately arranged with the first and second common electrodes 211 and 273. The second common electrodes 273 and the plurality of pixel electrodes 270 may be formed of a transparent conductive material such as indium-tin-oxide (ITO) and indium-zinc-oxide (IZO), and disposed on the same level. In addition, the first common line 273a may be formed of the same material and the same layer as the second common electrodes 273 and the pixel electrodes 270. The first common line 273a is disposed at a different layer from the first common electrode 211. Namely, the first common line 273a is disposed at a different level from the first common electrode 211. In FIG. 7, each of the data line 235, the first common electrodes 211, the second common electrodes 273 and the plurality of pixel electrodes 270 has a bent portion to produce multi-domains. However, there is no limitation in the shape. For instance, the data line 235, the first common electrodes 272, the second common electrodes 273 and the plurality of pixel electrodes 270 may have a linear (e.g. straight line) shape or a zigzag shape.

Figure 9:
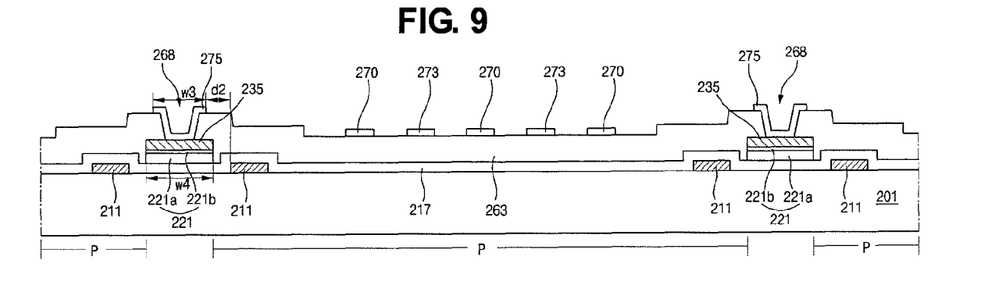
FIG. 9 is a cross-sectional view taken along the line IX-IX of FIG. 7.

An auxiliary data line 275 is formed along the data line 235. The auxiliary data line 275 is disposed over the data line 235 and has substantially the same shape as the data line 235. The auxiliary data line 275 is connected to the data line 235 through one or more data contact holes 268. At least two data contact holes 268 may be preferably formed at or near the both ends of the data line 235 in each pixel region P. The auxiliary data line 275 may be formed of a transparent conductive material such as indium-tin-oxide (ITO) and indium-zinc-oxide (IZO). A width w3 of the auxiliary data line 275 is equal to or smaller than a width w4 of the data line 235 (FIG. 9). The first common electrodes 211 are spaced apart from the auxiliary data line 275 by a second distance d2. Since the first common electrodes 211 are formed on a different layer than the data line 235 and the auxiliary data line 275, a sufficient distance between the first common electrode 211 and one of the data line 235 and the auxiliary data line 275 may not be needed and no possibility of shoring defect exists. Accordingly, the second distance d2 is smaller than the first distance d1 of FIG. 5, and a black matrix on a color filter substrate has a relatively small width to cover a portion between the first common electrode 211 and the auxiliary data line 275. As a result, the aperture ratio is improved. In addition the first common line 273a is spaced apart from the auxiliary data line 275 by a third distance d3 greater than the second distance d2 between the first common electrode 211 and the auxiliary data line 275. Accordingly, an electrical short problem between the first common line 273 and the auxiliary daya line 275 is prevented.

In addition, the drain electrode 241 extends and overlaps the second common line 209. An overlapped portion of the second common line 209 functions as a first capacitor electrode 214, and an overlapped portion of the drain electrode 241 functions as a second capacitor electrode 243. The gate insulating layer and the semiconductor layer interposed between the first and second capacitor electrodes 241 and 243 function as a dielectric material. The first capacitor electrode 214, the second capacitor electrode 243, the gate insulating layer and the semiconductor layer constitute a storage capacitor StgC.

Figure 8:
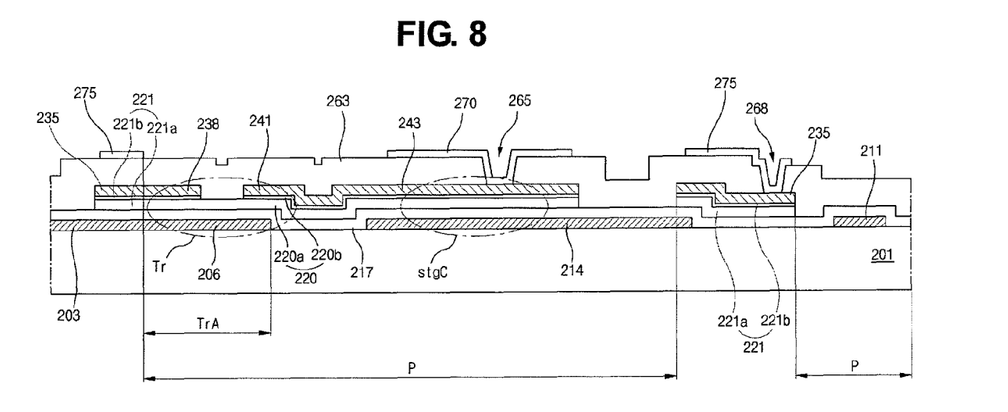
FIG. 8 is a cross-sectional view taken along the line VIII-VIII of FIG. 7.

FIG. 8 is a cross-sectional view taken along the line VIII-VIII of FIG. 7, and FIG. 9 is a cross-sectional view taken along the line IX-IX of FIG. 7. As shown in FIGS. 8 and 9, a plurality of pixel regions P and switching regions TrA are defined on the substrate 201. The gate line 203, the gate electrode 206, the second common line 209, the first capacitor electrode 214 and the first common electrodes 211 are formed on the substrate 201. The gate line 203 in the switching region TrA functions as the gate electrode 206. Namely, the gate electrode 206 is a portion of the gate line 203. The second common line 209 is parallel to and spaced apart from the gate line 203. A portion of the second common line 209 functions as the first capacitor electrode 214. The first common electrodes 211 are formed at or near the boundary portions of the pixel region P. The first common electrodes 211 can extend substantially perpendicular to the gate line 203. A gate insulating layer 217 is formed on the gate line 203, the gate electrode 206, the second common line 209, the first capacitor electrode 214 and the first common electrodes 211. A semiconductor layer 220 including an active layer 220a of intrinsic amorphous silicon and an ohmic contact layer 220b of impurity-doped amorphous silicon is formed on the gate insulating layer 217. The source electrode 238 and the drain electrode 241 are formed on the semiconductor layer 220 and spaced apart form each other. The active layer 220a under the ohmic contact layer 220b is exposed through the source and drain electrodes 238 and 241. The gate electrode 206, the semiconductor layer 220 including the active layer 220a and the ohmic contact layer 220b, the source electrode 238 and the drain electrode 241 constitute the TFT Tr in the switching region TrA. The data line 235 is connected to the source electrode 238 and crosses the gate line 203 to define the pixel region P.

Since an intrinsic amorphous silicon layer, an impurity-doped amorphous silicon layer and a conductive metal layer are etched using a single mask to form the source electrode 238, the drain electrode 241, the data line 235, the ohmic contact layer 220b and the active layer 220a, a semiconductor pattern 221 including an intrinsic amorphous silicon pattern 221a and an impurity-doped amorphous silicon pattern 221b may be disposed under the data line 235. The intrinsic amorphous silicon pattern 221a and the impurity-doped amorphous silicon pattern 221b respectively extend from the active layer 220a and the ohmic contact layer 220b. However, when the source electrode, the drain electrode and the data line are formed using a different mask process than the active layer and the ohmic contact layer, the intrinsic amorphous silicon pattern 221a and the impurity-doped amorphous silicon pattern 221b may not exist under the data line 235. The drain electrode 241 extends and overlaps the second common line 209 to define the first and second capacitor electrodes 214 and 243. As mentioned above, the first capacitor electrode 214, the second capacitor electrode 243, the gate insulating layer 217 and the semiconductor layer 220 between the first and second capacitor electrodes 214 and 243 constitute the storage capacitor StgC. When the source electrode, the drain electrode and the data line are formed using a different mask process than the active layer and the ohmic contact layer, a single dielectric material of the gate insulating layer may exist between the first and second capacitor electrodes 214 and 243.

A passivation layer 263 having the drain contact hole 265, the common contact hole 267 (of FIG. 7) and the data contact hole 268 is formed on the source electrode 238, the drain electrode 241 and the data line 235. The drain contact hole 265 exposes the drain electrode 241, the common contact hole 267 (of FIG. 7) exposes the first common electrode 211, and the data contact hole 268 exposes the data line 235. More specifically, the drain contact hole 265 exposes the second capacitor electrode 243. The plurality of pixel electrodes 270, the second common electrodes 273 and the auxiliary data line 275 are formed on the passivation layer 263. The plurality of pixel electrodes 270 are connected to the drain electrode 241 through the drain contact hole 265, the second common electrodes 273 are connected to the first common electrodes 211 through the common contact hole(s) 267 (of FIG. 7), and the auxiliary data line 275 is connected to the data line 235 through the data contact hole(s) 268. The second common electrodes 273 (excluding the first common line 273a) are disposed between the first common electrodes 211. The plurality of pixel electrodes 270 are disposed between one of the first common electrodes 211 and one of the second common electrodes 273 and between the second common electrodes 273. In other words, the plurality of pixel electrodes 270 are alternately arranged with the first and second common electrodes 211 and 273. The plurality of pixel electrodes 270 and the second common electrodes 273 are formed of a transparent conductive material such as indium-tin-oxide (ITO) and indium-zinc-oxide (IZO). The plurality of pixel electrodes 270, the first common electrodes 211 and the second common electrodes 273 are substantially parallel to the data line 235. The plurality of pixel electrodes 270, the first common electrodes 211 and the second common electrodes 273 may have a bent shape to produce multi-domains, but other shapes are possible. The auxiliary data line 275 may be also formed of a transparent conductive material such as indium-tin-oxide (ITO) and indium-zinc-oxide (IZO), and disposed over the data line 235. The auxiliary data line 275 has substantially the same shape as the data line 235. As mentioned, the width w3 of the auxiliary data line 275 is equal to or smaller than the width w4 of the data line 235. The auxiliary data line 275 is spaced apart from the first common electrodes 211 by the second distance d 2. As mentioned above, since the first common electrodes 211 are formed on a different layer than the data line 235 and the auxiliary data line 275, there is no shorting defect. Accordingly, since the second distance d2 is smaller than the first distance d1, the aperture ratio is improved.

Moreover, in the array substrate for the IPS mode LCD device according to the second embodiment of the present invention, since the auxiliary data line 275 is disposed over and connected to the data line 235, the TFT Tr can receive the signal due to the auxiliary data line 275 when the data line 235 disconnected. Namely, the auxiliary data line 275 functions as a self-repairing line, which is advantageous.

Furthermore, since the plurality of pixel electrodes 270 and the second common electrodes 273 are formed on the same level, a perfect horizontal electric field is generated between the pixel electrode 270 and the second common electrode 273 such that the IPS mode LCD device displays improved images. In addition, since there is no insulating layer, for example, a gate line and a passivation layer, between the second common electrodes and the pixel electrodes, power consumption decreases.

Methods for fabricating the array substrates of the first and second embodiments are discussed. Particularly, a method of fabricating the array substrate according to the second embodiment of the present invention is specifically explained. Parts of the array substrate in the first embodiment that are the same as parts of the array substrate in the second embodiment may be formed in the same or similar manner.

First, a first conductive metal layer is formed on the substrate by depositing a first conductive metallic material including at least one of aluminum (Al), aluminum alloy (AlNd), copper (Cu), copper (Cu) alloy, chromium (Cr) and molybdenum (Mo). The first conductive metal layer is patterned to form the gate line, the common line and the first common electrodes. The gate line in the switching region functions as the gate electrode, and a portion of the common line functions as the first capacitor electrode. In the first embodiment, the first common electrode is not formed of the first conductive metal layer.

Next, the gate insulating layer is formed on the gate line, the common line and the first common electrodes by depositing one of an inorganic insulating material including silicon oxide ($SiO_2$) and silicon nitride ($SiN_x$) and an organic insulating material including benzocyclobutene (BCB) and photoacryl.

Next, an intrinsic amorphous silicon layer, an impurity-doped amorphous silicon layer and a second conductive metal layer are sequentially formed on the gate insulating layer. The intrinsic amorphous silicon layer, the impurity-doped amorphous silicon layer and the second conductive metal layer are patterned using one of a refractive exposing mask and a half-tone mask to form the active layer, the ohmic contact layer, the source electrode, the drain electrode and the data line. The gate electrode, the active layer, the ohmic contact layer, the source electrode and the drain electrode constitute the TFT in the switching region. The source electrode is connected to the data line and spaced apart from the drain electrode. The ohmic contact layer is etched using the source and drain electrodes as an etching mask to expose the active layer. The data line crosses the gate line to define the pixel region. The drain electrode extends and overlaps the first capacitor electrode to form the storage capacitor. Since the intrinsic amorphous silicon layer, the impurity-doped amorphous silicon layer and the second conductive metal layer are patterned using a single mask, the intrinsic amorphous silicon pattern and the ohmic contact pattern exist under the data line. However, when the intrinsic amorphous silicon layer, the impurity-doped amorphous silicon layer and the second conductive metal layer are patterned using different masks, the intrinsic amorphous silicon pattern and the ohmic contact pattern may not exist under the data line.

Next, the passivation layer is formed on the source electrode, the drain electrode and the data line by depositing one of an inorganic insulating material including silicon oxide ($SiO_2$) and silicon nitride ($SiN_x$) and an organic insulating material including benzocyclobutene (BCB) and photoacryl. The passivation layer is patterned to form the drain contact hole, the common contact hole and the data contact hole. The drain contact hole exposes the drain electrode, the common contact hole exposes the first common electrodes, and the data contact hole exposes the data line. Since the first common electrodes are formed under the gate insulating layer in the second embodiment, the gate insulating layer is patterned with the passivation layer to expose the first common electrodes. In the first embodiment, since the first common electrode is formed under the passivaiton layer, the common contact hole exposes the common line.

Next, a transparent conductive material layer is formed on the passivation layer by depositing a transparent conductive material including indium-tin-oxide (ITO) and indium-zinc-oxide (IZO). The transparent conductive material layer is patterned to form the second common electrodes, the plurality of pixel electrodes and the auxiliary data line. The second common electrodes are connected to the first common electrodes through the common contact hole(s), the plurality of pixel electrodes are connected to the drain electrode through the drain contact hole(s), and the auxiliary data line is connected to the data line through the data contact hole(s). The plurality of pixel electrodes are alternately arranged with the first common electrodes and the second common electrodes. The plurality of pixel electrodes, the first common electrodes and the second common electrodes are substantially parallel to the data line. The auxiliary data line has a width equal to or smaller than of the data line. In the first embodiment, the first common electrodes are formed of the transparent conductive material layer. The first common electrodes are connected to the common line through the common contact hole.

Consequently, in an array substrate for an LCD device according to the embodiments of the present invention, since an auxiliary data line connected to a data line is formed over the data line, the auxiliary data line advantageously functions as a self-repairing line for disconnecting of the data line. Moreover, since the pixel electrodes and common electrodes are formed on the same level, the IPS mode LCD device can display improved images and power consumption decreases. Furthermore, a different number of pixel electrodes, first common electrodes and second common electrodes in each pixel region can be provided.

It will be apparent to those skilled in the art that various modifications and variations can be made in the LCD device and fabricating method thereof of the present invention without departing from the spirit or scope of the invention. Thus, it is intended that the present invention cover the modifications and variations of this invention provided they come within the scope of the appended claims and their equivalents.

What is claimed is:

1. An array substrate for an in-plane switching mode liquid crystal display device, comprising:
   a gate line on a substrate;
   a data line crossing the gate line to define a pixel region;
   an auxiliary data line disposed over the data line and connected to the data line;
   a thin film transistor connected to the gate line and the data line;
   a first common line parallel to and spaced apart from the gate line;
   a plurality of pixel electrodes disposed in the pixel region and connected to the thin film transistor; and
   a plurality of common electrodes alternately arranged with the plurality of pixel electrodes in the pixel region and including first common electrodes disposed at a boundary area of the pixel region and at least one second common electrode between the first common electrodes, an end of the at least one second common electrode extending from the first common line,
   wherein the first common line, the second common electrode, the plurality of pixel electrodes and the auxiliary data line are formed of a same material and a same layer as one another and are disposed at a different level from the first common electrodes, and wherein a distance between the first common line and the auxiliary data line is greater than a distance between one of the first common electrode and the auxiliary data line.

2. The array substrate according to claim 1, wherein the first common electrodes are connected to a second common line, and the at least one second common electrode extends substantially to be parallel to the date line and not directly connected to the second common line.

3. The array substrate according to claim 2, wherein the at least one second common electrode is connected with the first common electrodes through at least one common contact hole.

4. The array substrate according to claim 1, further comprising:
   a second common line extending substantially parallel to the gate line and connected to at least a part of the plurality of common electrodes,
   wherein the first common line extends substantially parallel to and spaced apart from the second common line.

5. The array substrate according to claim 1, wherein the first common electrodes are formed of a different layer than the data line and the auxiliary data line.

6. The array substrate according to claim 5, wherein the first common electrodes are formed of a same material and a same layer as the gate line.

7. The array substrate according to claim 1, wherein each of the first common line, the second common electrode, the plurality of pixel electrodes and the auxiliary data line includes one of indium-tin-oxide and indium-zinc-oxide.

8. The array substrate according to claim 1, wherein the auxiliary data line has a width equal to or smaller than the data line.

9. The array substrate according to claim 1, wherein the plurality of pixel electrodes and the plurality of common electrodes each have at least one bent portion.

10. The array substrate according to claim 1, further comprising:
    a passivation layer having at least two data contact holes and interposed between the data line and the auxiliary data line, wherein the two data contact holes correspond to both ends of the data line, and the auxiliary data line is connected to the data line through the two data contact holes.

11. The array substrate according to claim 1, further comprising:
    a second common line substantially parallel to the gate line, wherein the plurality of common electrodes are electrically connected to the second common line.

12. The array substrate according to claim 11, further comprising:
    a passivation layer having a common contact hole exposing the first common electrodes, wherein the first common line on the passivation layer is connected to the first common electrodes through the common contact hole.

13. The array substrate according to claim 11, further comprising:
    a first capacitor electrode connected to the thin film transistor and overlapping the second common line, wherein the first capacitor electrode, an overlapped portion of the second common line and an insulating layer between the first capacitor electrode and the overlapped portion of the second common line constitute a storage capacitor.

14. The array substrate according to claim 1, wherein the thin film transistor includes:
    a gate electrode connected to the gate line,
    a gate insulating layer on the gate electrode,
    a semiconductor layer on the gate insulating layer,
    a source electrode on the semiconductor layer connected to the data line, and
    a drain electrode on the semiconductor layer and spaced apart from the source electrode.

15. A method of fabricating an array substrate for an in-plane switching mode liquid crystal display device, comprising:

forming a gate line, a gate electrode, a first common line, and first common electrodes on a substrate, the gate electrode connected to the gate line, the first common electrodes connected to the first common line;

forming a gate insulating layer on the gate line, the gate electrode, the first common line, and the first common electrodes;

forming a semiconductor layer on the gate insulating layer, source and drain electrodes on the semiconductor layer and spaced apart from each other, and a data line connected to the source electrode and crossing the gate line;

forming a passivation layer on the source electrode, the drain electrode and the data line, the passivaton layer having a data contact hole exposing the data line, a drain contact hole exposing the drain electrode and at least one common contact hole exposing the first common electrodes; and forming a plurality of pixel electrodes, a second common line, a second common electrode and an auxiliary data line on the passivation layer, wherein the plurality of pixel electrodes and the second common electrode are disposed between the first common electrodes and alternately arranged with each other, the plurality of pixel electrodes are connected to the drain electrode through the drain contact hole, the second common line is connected to the first common electrodes through the at least one common contact hole, and the auxiliary data line is connected to the data line through the data contact hole.

16. A liquid crystal display device, comprising:
a first substrate including:
    a gate line and a data line crossing the gate line on a base substrate, so as to define a pixel region,
    an auxiliary data line disposed over the data line and connected to the data line;
    a thin film transistor connected to the gate line and the data line,
    a plurality of pixel electrodes disposed in the pixel region and connected to the thin film transistor,
    a first common line extending substantially parallel to the gate line, and
    a plurality of common electrodes alternately arranged with the plurality of pixel electrodes in the pixel region and including first common electrodes disposed at a boundary area of the pixel region and at least one second common electrode between the first common electrodes;
a second substrate; and
a liquid crystal layer disposed between the first and second substrates,
wherein the first common line, the second common electrode, the plurality of pixel electrodes and the auxiliary data line are formed of a same material and a same layer as one another and are disposed at a different level from the first common electrodes, and wherein a distance between the first common line and the auxiliary data line is greater than a distance between one of the first common electrode and the auxiliary data line.

* * * * *